US009767184B2

(12) United States Patent
Fish

(10) Patent No.: US 9,767,184 B2
(45) Date of Patent: Sep. 19, 2017

(54) METHODS AND APPARATUS FOR FACILITATING CONTEXT SEARCHING

(76) Inventor: Robert D. Fish, Tustin, CA (US)

( * ) Notice: Subject to any disclaimer, the term of this patent is extended or adjusted under 35 U.S.C. 154(b) by 372 days.

(21) Appl. No.: 11/677,875

(22) Filed: Feb. 22, 2007

(65) Prior Publication Data

US 2007/0219983 A1    Sep. 20, 2007

Related U.S. Application Data

(60) Provisional application No. 60/782,351, filed on Mar. 14, 2006.

(51) Int. Cl.
G06F 17/30 (2006.01)

(52) U.S. Cl.
CPC .............................. G06F 17/30646 (2013.01)

(58) Field of Classification Search
CPC ......... G06F 17/30864; G06F 17/30696; G06F 17/30554; G06F 17/30643; G06F 17/30528; G06F 17/3061; G06F 17/30011; G06F 17/30719; G06F 17/30997; G06F 17/30663; G06F 17/30268; G06F 17/30424; G06F 17/30345; G06F 17/30522; G06F 17/30967; G06F 17/30646
USPC ............ 707/1–3, 5, E17.063, 4, 6, 706, 722, 707/999.005
See application file for complete search history.

(56) References Cited

U.S. PATENT DOCUMENTS

| | | | | |
|---|---|---|---|---|
| 5,278,980 A * | 1/1994 | Pedersen | ........... | G06F 17/30011 |
| 5,542,090 A * | 7/1996 | Henderson et al. | ............... | 707/2 |
| 5,544,360 A * | 8/1996 | Lewak et al. | ...................... | 707/1 |
| 6,032,145 A * | 2/2000 | Beall et al. | ........................ | 707/5 |
| 6,064,961 A * | 5/2000 | Hanson | .......................... | 704/260 |
| 6,078,892 A * | 6/2000 | Anderson et al. | .............. | 705/10 |
| 6,256,623 B1 * | 7/2001 | Jones | ................................ | 707/3 |
| 6,314,419 B1 * | 11/2001 | Faisal | ............... | G06F 17/30646 707/739 |
| 6,336,116 B1 * | 1/2002 | Brown et al. | .................... | 707/10 |
| 6,363,378 B1 * | 3/2002 | Conklin | ............ | G06F 17/30646 |
| 6,408,293 B1 * | 6/2002 | Aggarwal et al. | | |
| 6,411,962 B1 * | 6/2002 | Kupiec | | |
| 6,446,068 B1 * | 9/2002 | Kortge | | |
| 6,470,334 B1 * | 10/2002 | Umemoto | | |
| 6,510,434 B1 * | 1/2003 | Anderson et al. | | |
| 6,684,204 B1 * | 1/2004 | Lal | | |
| 7,099,860 B1 * | 8/2006 | Liu et al. | .......................... | 707/3 |
| 7,111,243 B1 * | 9/2006 | Ballard et al. | ................ | 715/744 |
| 7,143,348 B1 * | 11/2006 | Krause | ........................... | 715/236 |
| 2002/0049922 A1 * | 4/2002 | Direen, Jr. | ........................ | 714/1 |

(Continued)

*Primary Examiner* — Shiow-Jy Fan
(74) *Attorney, Agent, or Firm* — Fish IP Law, LLC.

(57) ABSTRACT

A search engine provides summary context information for search terms across many or all of the matched records. The summary information can include additional terms including single words, phrases, pairs or other groupings of words, as well as tags or other information having special meaning. Search engines or other providers can allow users to click on or otherwise select one or more of the additional terms. Such selection can be used to add the selected term(s) to a subsequent search, and/or display to the searcher examples of the selected term(s) in context of at least one of selected ones of the plurality of records. Searchers can advantageously be given an ability to set the size of the window from which the additional terms are drawn, the number of records searched.

15 Claims, 7 Drawing Sheets

(56) References Cited

U.S. PATENT DOCUMENTS

| | | | |
|---|---|---|---|
| 2002/0138475 A1* | 9/2002 | Lee | 707/3 |
| 2002/0143742 A1* | 10/2002 | Nonomura et al. | 707/1 |
| 2002/0143758 A1* | 10/2002 | Aref | 707/4 |
| 2003/0171910 A1* | 9/2003 | Abir | 704/1 |
| 2003/0212663 A1* | 11/2003 | Leno et al. | 707/3 |
| 2004/0006740 A1* | 1/2004 | Krohn et al. | 715/513 |
| 2004/0122656 A1* | 6/2004 | Abir | 704/4 |
| 2005/0149510 A1* | 7/2005 | Shafrir | 707/3 |
| 2005/0160080 A1* | 7/2005 | Dawson | 707/3 |
| 2006/0004734 A1* | 1/2006 | Malkin et al. | 707/4 |
| 2006/0242137 A1* | 10/2006 | Shah et al. | 707/4 |
| 2006/0248078 A1* | 11/2006 | Gross et al. | 707/5 |
| 2007/0033221 A1* | 2/2007 | Copperman et al. | 707/103 R |

\* cited by examiner

METHODS AND APPARATUS FOR FACILITATING CONTEXT SEARCHING

This application claims priority to U.S. provisional application No. 60/782,351, filed Mar. 14, 2006.

FIELD OF THE INVENTION

The field of the invention is electronic searching of information.

BACKGROUND

It is now a commonplace observation that ordinary searchers will often run searches that yield intractably large results sets. Search engines have tried to resolve that problem by ranking the results, and in some cases by trying to limit the size of the data set upon which the search is run.

The exact ranking algorithms are almost always kept as trade secrets, but it suffices to say that no given ranking algorithm will be right for all searchers. One person searching the Internet for "poodle" might be looking to buy a dog, and another might be looking for obscure articles on the tendency of miniature poodles to have bad teeth. Thus, all ranking systems are necessarily inadequate, regardless of whether they rank by popularity of web pages, the length of time that prior searchers viewed a web page, the number of times a search term occurs in the text, the amount of text on the page, or by any other system.

For similar reasons, efforts to limit the size of the data set upon which the search is run are helpful in some circumstances, but are by no means a panacea. Google™, for example, allows searchers to run queries against records sets in various groups, such as Arts and Entertainment, Business and Finance, Computers, Health, Home, News and so forth. But such groups are often underinclusive, overinclusive or both, and in any event are useful mostly to searchers having only the most rudimentary searching skills, or simplistic searching needs.

A significant problem that has not adequately been addressed is the laser beam nature of a search request. A search for records having two or three keywords will identify precisely those records having those keywords, and nothing else. Yes, some systems are sophisticated enough to expand the search to include non-standard plurals (i.e., search for "women" when the searcher entered "woman") and even related terms (female, girl, etc). But then the searches are still performed on those expanded terms. The whole process is bit like someone looking around in a darkened room with a laser pointer. What they really need is a search beam that provides perspective on what surrounds the center of the beam.

All of the major search engines do show snippets of text surrounding the query terms, which provides users some guidance on how they might narrow their searches. But in order to adequately use that contextual information, users are forced to search through page after page of text extractions to identify additional terms that might be of interest. That is just a colossal waste of time.

Ask Jeeves™ has long sought to resolve that problem by suggesting additional terms with which to narrow a search. For example, in response to the term "insurance", Ask Jeeves™ identifies over a hundred million hits, but then also suggests forty-seven subsets that result in narrower searches. Suggested subsets to the "insurance" search include Car Insurance, Health Insurance, Insurance Companies, Homeowners Insurance, Travel Insurance, and so forth. If one then selects "Car Insurance", Ask Jeeves™ suggests forty further subsets, including for example, Car Insurance Quotes, Car Insurance for Woman, AA Car Insurance, Motor Insurance, and Budget Car Insurance.

In some instances suggesting additional subsets may well prove helpful. But as the target record set against which the search is queried grows ever larger, even the subsets become intractable. Selecting "Car Insurance Quotes" gives almost six million hits. Drilling down further, one could select "Car Insurance for Woman", but that selection still gives more than two million hits. In addition, it is impossible for search engines to store subset suggestions for all possible searches. For example, in response to the search "poodle telephone", Ask Jeeves™ identifies over 250,000 web pages, but doesn't make a single suggestion as to narrowing the search.

The underlying problem is that users have no way of gaining a broad understanding of the context in which the search terms are used throughout the entire (or even significant portions) of the target record set. The most any searcher will likely do is review 100 or so text extractions, and that just isn't enough of a search beam to identify all or even most of the nearby terms that might be of interest, or to gain an understanding of how often or in what proximity other terms might be to the original search terms. And without that information the searcher is forced to view the database with tunnel vision, trying out perhaps several dozen different combinations in the hope that he would hit upon a combination of search terms that is neither terribly over-inclusive nor terribly under-inclusive.

Thus, what is still needed are systems and methods the provide summary context information for searches.

SUMMARY OF THE INVENTION

The present invention provides systems and methods in which a search engine examines numerous records to provide summary information regarding terms that occur nearby one or more of the search terms.

In a preferred class of embodiments, the search engine receives a search term from a searcher, searches an Internet-related or other database to identify a plurality of records containing the search term, identifies information within the plurality of records that occurs within a proximity about the search term, and then presents the searcher with a summary of the information. The summary can advantageously be displayed to the searcher as a listing of the additional terms. Such summaries are preferably sortable at the user's discretion, either alphabetically or according to a relative frequency with which the first and second additional terms occur within the proximity. Still further, common terms such as articles and linkers, "the", "an", "a", "and", "or", and so forth, can be omitted to focus the searcher's attention on more descriptive terms. The additional terms displayed to the searcher can be single words, phrases, pairs or other groupings of words, as well as tags or other information having special meaning. As specific examples, the additional terms could comprise XML or other data tags, values corresponding to the data tag, and so forth.

In another aspect, it is contemplated that search engines or other providers can allow users to click on or otherwise select one or more of the additional terms. Such selection can be used to add the selected term(s) to a subsequent search, and/or display to the searcher examples of the selected term(s) in context of at least one of selected ones of the plurality of records. Most preferably the examples would substantially center, and highlight in some manner, at least one of the selected term(s) within the examples.

In other aspects it is contemplated that searchers could be give the ability to set the size of the proximity, i.e., the size of the window from which the additional terms are drawn. That size could be set according to a numeric limit, such as a number of words or characters on one or either side of the search term, or in any other suitable fashion. It is also contemplated that a search engine could selecting the plurality of records for proximity analysis at least in part according to a number of records determined by a user. Thus, in searching for the term "dog" with more than half a billion hits, it makes no sense for the search engine to examine all of those records to prepare a listing of terms proximal to the word "dog". It makes much more sense for the search engine to rank the hits in its usual manner, or according to some other "likely importance" algorithm, and then perform the proximity analysis on the first hundred, five hundred, or perhaps a thousand records. Ideally, the searcher could at least have some input in determining the number of records analyzed.

All of this can be accomplished using substantially any search term. Contemplated search terms include simple one word terms in a human language such as "insurance" or "dog", but also include phrases, or even an image, an audio clip, or a video clip. All of this can also be accomplished by an ordinary searcher, i.e., a human being having no substantial training or experience in software development.

Those skilled in the art will appreciate that the term "search engine" is used herein in the loosest sense possible. Thus, the term "search engine" encompasses the software engines of Google™, Yahoo!™, MSN Search™, and others, but also the companies themselves, the server farms that run the software, and so forth.

DETAILED DESCRIPTION

Figure 1:
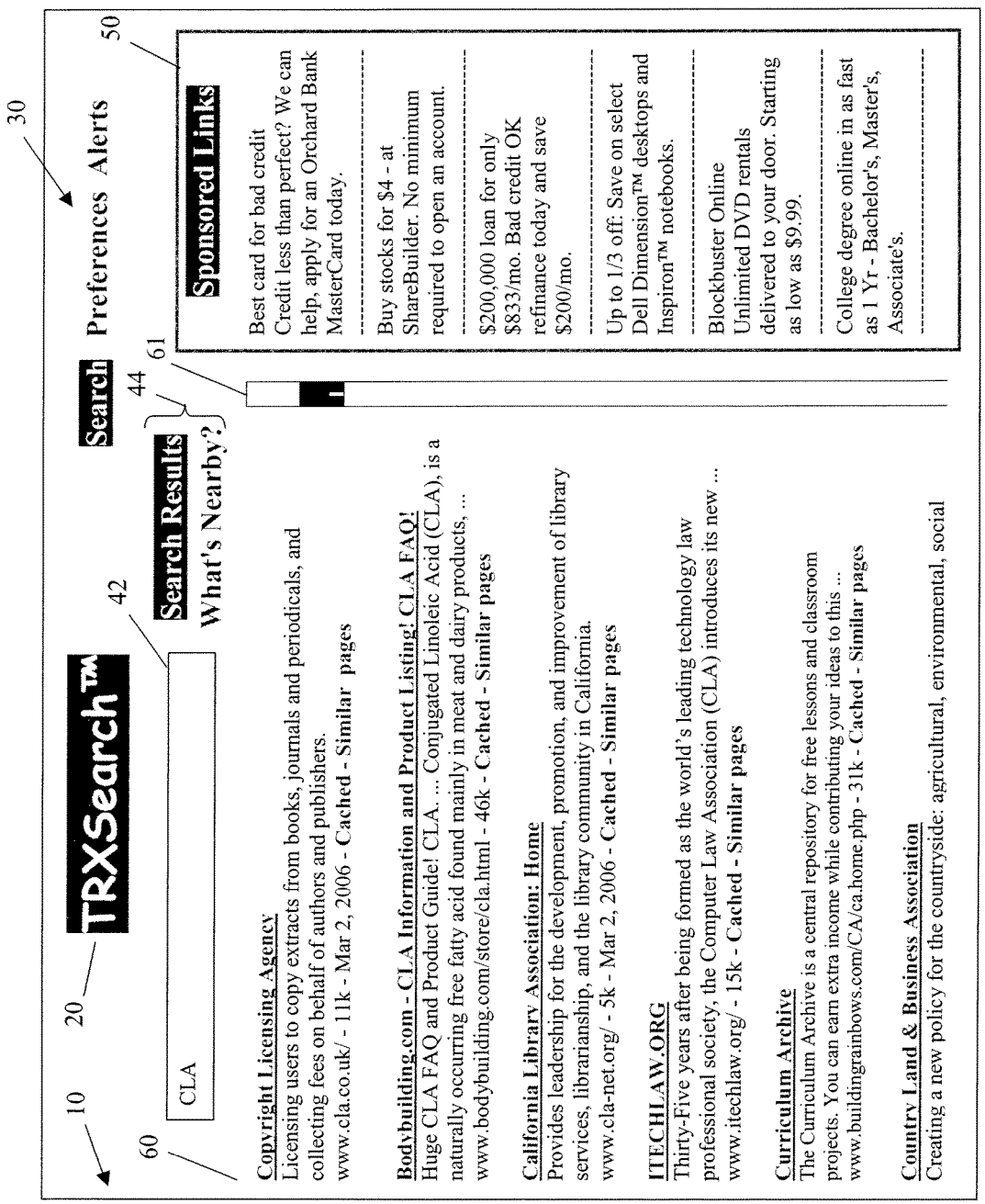
FIG. 1 is a mock-up of a search interface that includes a search term(s) entry box and a "What's Nearby?" radio button to access contexts of searches.

FIGS. 1-6 generally depict an interface 10 which includes title 20, a primary navigation section 30, a search box 42 with secondary navigation section 44, advertising section 50, and results display sections, 60, 70, 80, and 90. Each of the sections can be considered its own interface, as can each of the fields within the sections.

Navigation section 30 is shown here as having three radio buttons; Search, Preferences, and Alerts. Exemplary Search pages and a Preferences page are depicted in this application. Alerts pages are not separately shown or described herein because examples are well known in the field, and adaptation of known alerts strategies to include materials disclosed herein are well within the scope of ordinary skill in view of these disclosures.

In FIG. 1, a user has entered the search term "CLA" in search box 42, and has selected (or defaulted to) the "Search Results" button in the secondary navigation section 44. Entering of a search term, per se, is conventional, and it is contemplated that users could use any combination of terms, Boolean logic, wildcards and so forth. Section 60 is also shown here in a conventional manner, showing titles, page links, text extractions and other information for the top ranked six records. Slider 61 provides a mechanism for users to view more line items than can be shown on the display at a given time.

Although the records shown in this example are links to, and excepts from, web pages on the Internet, FIGS. 1-6 should be interpreted as being representative of searches of any database, including for example legal databases of the type used by Lexis™ and Westlaw™, and even private databases such as those containing company information. In addition, those skilled in the art will appreciate that the display 10 field layout, highlighting, and so forth are exemplary only, and that the specific mock-ups shown in these figures are to be interpreted as being representative of all suitable layouts, highlighting schemes, functional button and so forth in keeping with the teachings herein.

Figure 2:
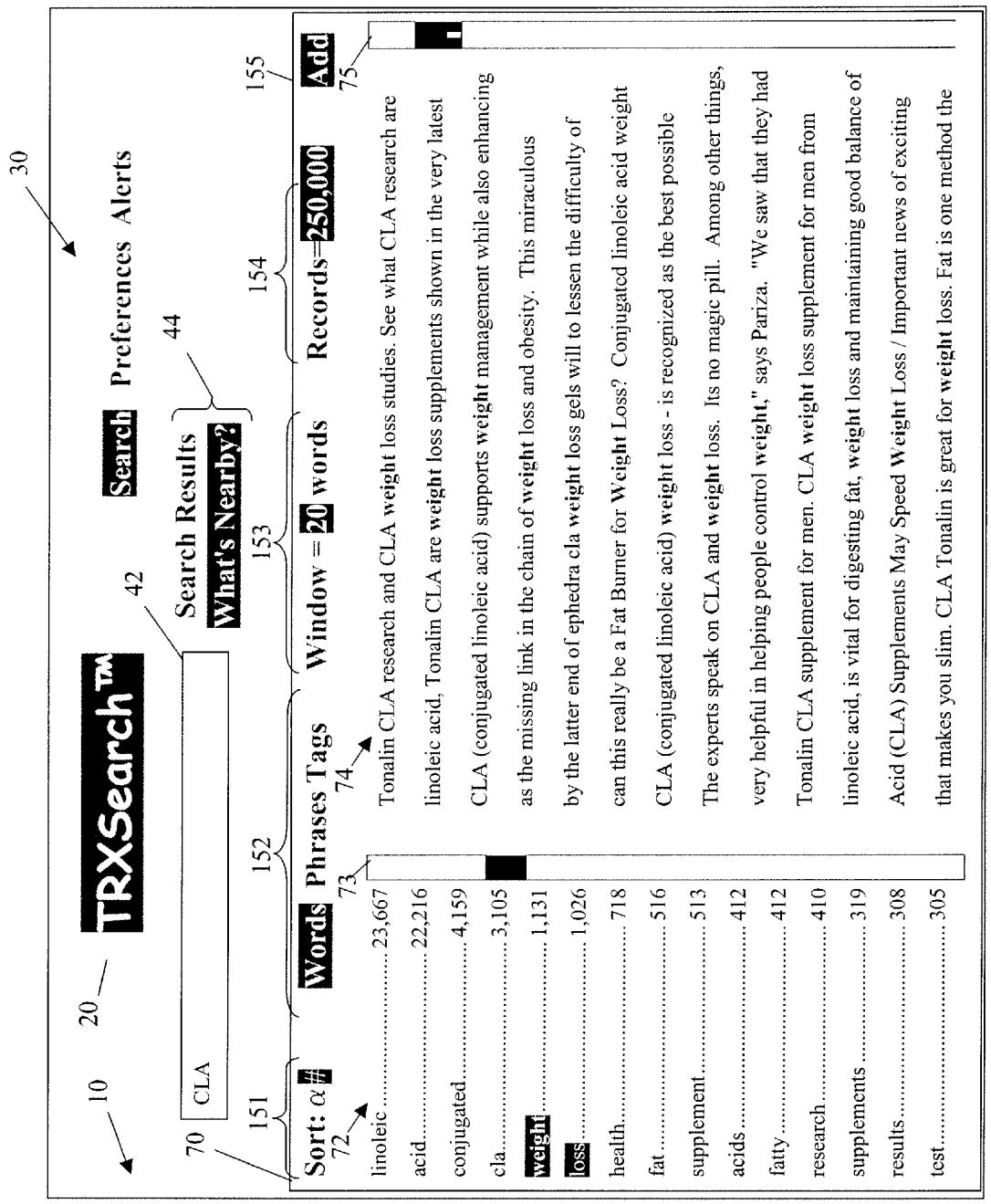
FIG. 2 is a mock-up of a search interface that includes a first table that lists words occurring within a given window of the search term(s) entered in the entry box, and a second table that lists that lists examples of the search term(s) in context of a selected one of the listed words.

In FIG. 2, the user has selected the "What's Nearby?" button in the secondary navigation section 44, which prompted the system to display the results display section 70. That section generally includes sections for selecting alpha or numeric sort 151, context selection 152, Window 153, number of Records examined 154, and two columns of data, 72 and 74. Column 72 comprises a summary of terms that fall within a given proximity of the search term(s) entered in box 42, preferably as they occur throughout the entire data set being examined. The sort (alpha or numeric according to frequency of occurrence) is set by sort buttons 151. The proximity is set by the window size 153, and the size of the data set (i.e. number of records) being examined is set by the records size 154. Sliders 73 and 75 provide a mechanism for users to view more line items than can be shown on the display at a given time.

Although previously unknown for use in the current context, algorithms for creating concordances are known. Preferred technology for preparing concordances is available at http://www.concordancesoftware.co.uk/.

In this hypothetical example, the term "linoleic" is shown as occurring 23,667 times in the highest ranked 250,000 records of the database being searched, within a window of 20 words on either side of the term CLA. Looking further down the list, the term "conjugated" is shown as occurring only 31,05 times in the highest ranked 250,000 records of the database being searched, within a window of 20 words on either side of the term CLA.

Those skilled in the art will immediately appreciate that the items in column 72 are sorted alphabetically in accordance with the alpha choice in section 151, and that the user could readily change the sort choice to numeric, alter the number of words in the window, and the number of records being considered. Those skilled in the art will also appreciate that the listing of items in column 72 excludes occurrences of common articles "a", "the", "an" and other words that are likely to be of little interest to the searcher. It is contemplated that users could set the window by number of characters instead of number of words, and that the number of records examined to develop the summary data of column 72 could be much smaller or larger than 240, and potentially even set to examine all records of a data set. The tradeoff of course in examining too many records is that the processing requirement might have a decidedly negative effect on the response time. A default window size and/or default number of records to be considered in preparing concordances can be advantageously set on a Preferences page (see e.g., FIG. 7, element 322).

In the particular hypothetical example of FIG. 2, the user has selected the term "weight" and "loss" for further analysis. In response the system has listed surrounding text for instances of the term "weight" or "loss" occurring within the 20 word window of the search term "CLA". The terms "weight" and/or "loss" is/are more or less centered in each line. Obviously, if the user had chose a different term from column 72, such as "fatty", the column 74 would list instances of, and text surrounding the term "fatty", but only in records in which the term "fatty" occurs within the 20 word window within the 250,000 top ranked records. It is contemplated that a user could select more than one term from column 72, preferably using the Windows™ standard key combinations, <shift><click> or <cntrl><click>. In the event that the user wants to conveniently add one or more selected terms from column 72, the system also provides an "Add" button 155 on the far right of the display 10.

One issue arises as to what should be done about multiple search terms. For example, if a person searches for "apple AND banana", should the system respond by showing additional terms in a window about "apple" and also show additional terms in a window about "banana"? Similarly, what should the system do if the term "apple" appears ten times in a single web page or other record? These are all design considerations, and it is contemplated that different search engines would implement the inventive concepts herein in disparate ways. The current preference would be to count each occurrence of a search term as a separate instance, unless the two occurrences are within overlapping windows. On the other hand, if a searcher is already looking for words in proximity to each other, as in the searches "apple*banana" or "apple near/5 banana", then the window preferably is taken about the most extreme occurrences of the searched for proximity. Thus, if the search for "apple * banana" retrieved a record having the following text, "eat at least one serving of a high fiber, fruit or vegetable every day. Apple. Apricot. Asparagus. Banana. Beans (kidney, navy, lima, pinto, lentils)" then the current preference would be for the context window to be a fixed number of words to the left of the term "apple" and a fixed number of words to the right of the term "Banana", even though the terms "apple" and/or "banana" appear elsewhere in the record at greater than three words apart.

It is also contemplated that the context windows could be variable according to circumstance. Thus, if the web page or other record included long lists of somewhat related nouns or verbs that are strung together in a nonsensical fashion, which is often the case where web designers are trying to game the ranking algorithm, the system may well set the context window to zero for those particular lists.

Figure 3:
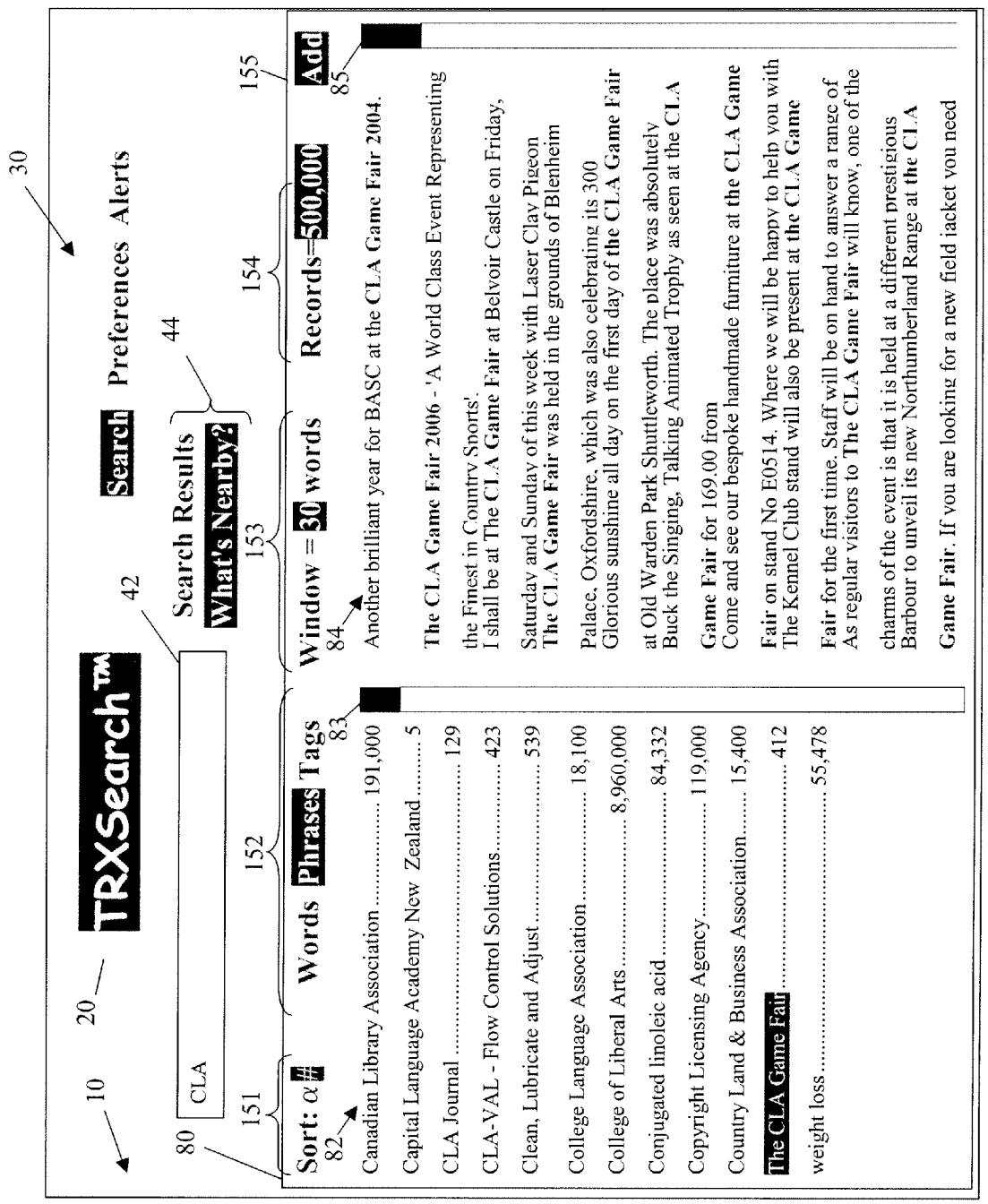
FIG. 3 is a mock-up of a search interface that includes a first table that lists phrases occurring within a given window of the search term(s) entered in the entry box, and a second table that lists that lists examples of the search term(s) in context of a selected one of the listed phrases.

FIG. 2 also shows a radio button section 152 for a user to select among "Words", "Phrases", and "Tags". In FIG. 2 the user has selected (or the system has defaulted to) "Words". In FIG. 3 the user has selected (or the system has defaulted to) "Phrases", and in FIG. 4 the user has selected (or the system has defaulted to) "Tags".

In FIG. 3, the user has chosen the appropriate radio button of section 152 to view context for Phrases instead of Words. Consequently, the system shows phrases in column 82, and shows specific instances of a selected phrase or phrases in column 84. Sliders 83 and 85 provide a mechanism for users to view more line items than can be shown on the display at a given time. In this particular example, the user has also chosen to list the phrases alphabetically, to use a window of 30 words, and to run the analysis on 500,000 records.

Determination of what in considered to be a phrase can be made in any suitable manner. For example, it is contemplated that the search engine could base its phrase searching on an existing compilation such as that provided by http://www.phrases.org.uk/ or Phrases In English at http://pie.us-na.edu/. These and all other extrinsic materials discussed herein are incorporated by reference. It is preferred, however, that the search engine develop its own list of phrases, based upon user searches. Thus, every time a user searches for a phrase in quotation marks, and that phrase generates a hit list of more than a given threshold (perhaps 500 or 1,000 hits), then the system adds that phrase to the list. It is also contemplated that a user could set a field on a Preferences page or elsewhere that limits the phrases being considered by the system in the current user's searches to those having a given threshold of hits (see e.g., FIG. 7, element 324). For example, a user might well want to set the threshold hits for phrases to 100,000, so that only the more common phrases are considered in preparing the phrase concordance. Alternatively, or in addition, a user might well want to set an upper and/or lower limit to the size of phrases (number of words or number of characters) being considered (see e.g., FIG. 7, element 326). At present a preferred threshold is 10,000 hits and preferred size limits on the phrases is between 2 and 6 words.

Figure 4:
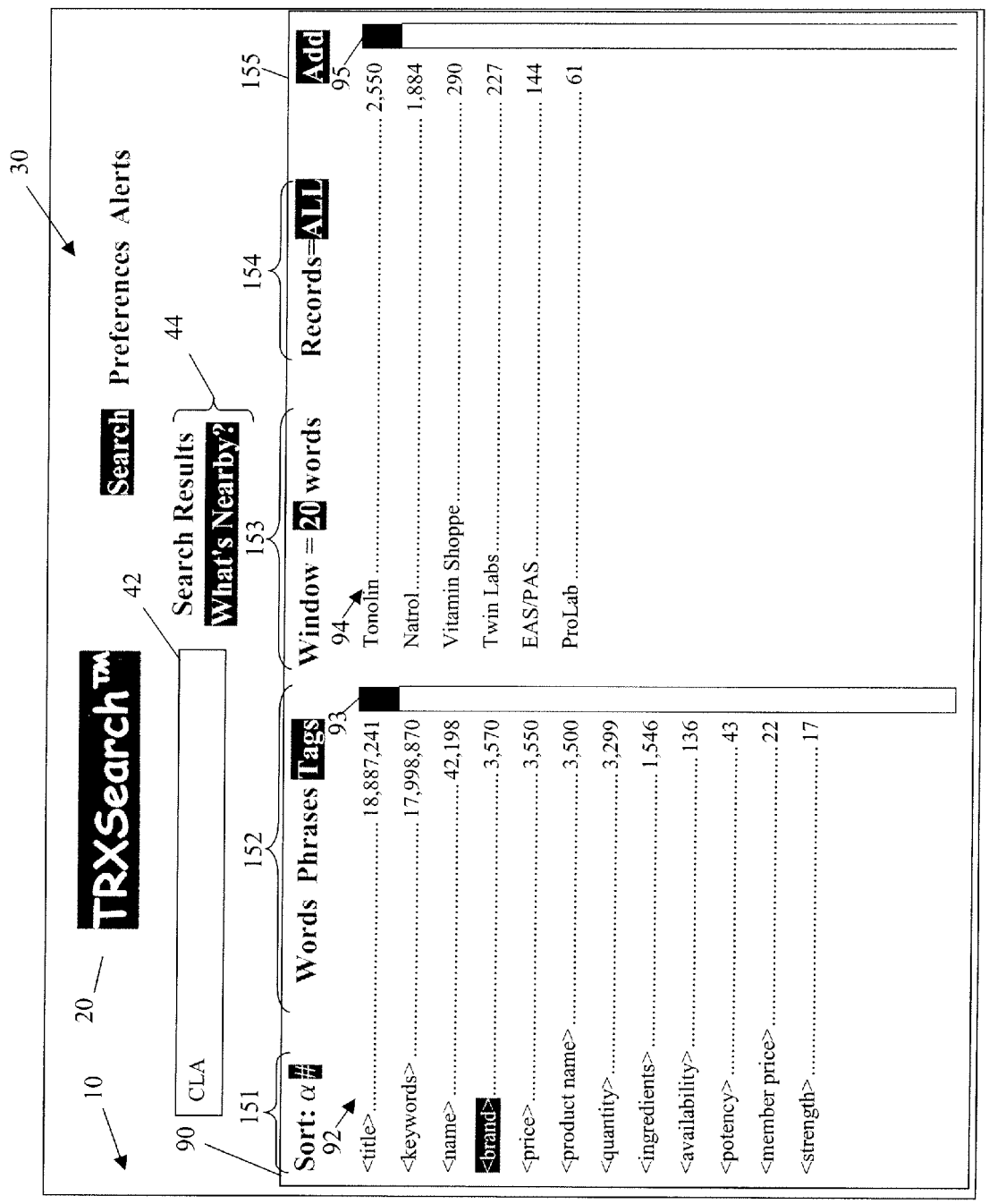
FIG. 4 is a mock-up of a search interface that includes a first table that lists metatags occurring within a given window of the search term(s) entered in the entry box, and a second table that lists that lists examples of values associated with a selected one of the listed metatags.

In FIG. 4, the user has chosen the appropriate radio button of section 152 to view context for Tags instead of Words or Phrases. Consequently, the system shows tag names in column 92, and shows specific values for a selected tag in column 94. Sliders 93 and 95 provide a mechanism for users to view more line items than can be shown on the display at a given time. In this particular example, the user has also chosen to list the tag numerically according to frequency of occurrence, to use a window of 20 words, and to run the analysis on all records.

The system can consider any type of metatag as a tag, but most preferably focuses on XML type tags because they are currently thought to be the most popular. The type of tags searched could be selected in a Preferences page (see e.g., FIG. 7, element 328), or elsewhere.

Figure 5:
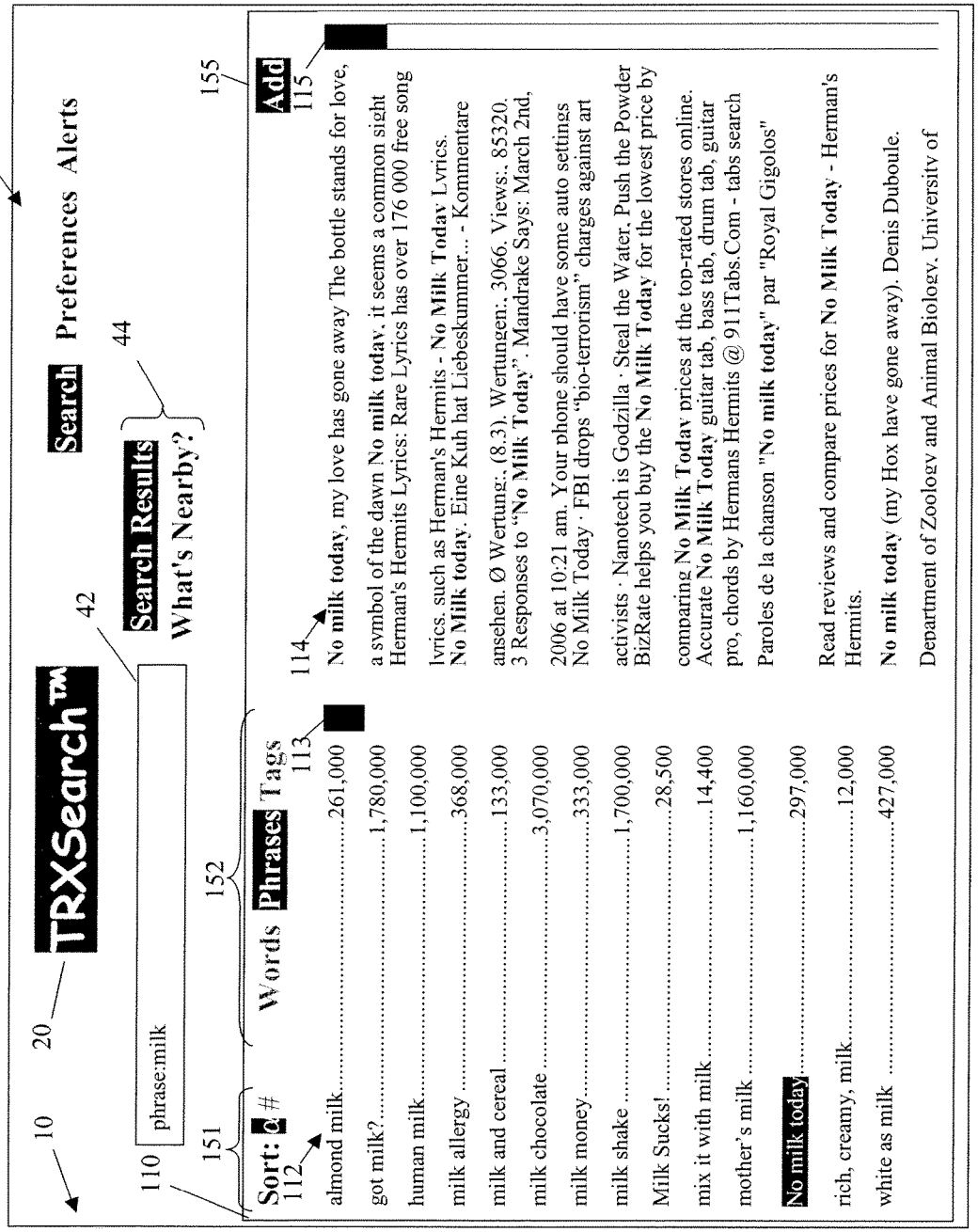
FIG. 5 is a mock-up of a search interface that includes a first table that lists phrases occurring within records of the Internet or other database, and a second table that lists exemplary occurrences of the search term(s) showing examples of actual usage of a selected one of the listed phrases.
Figure 6:
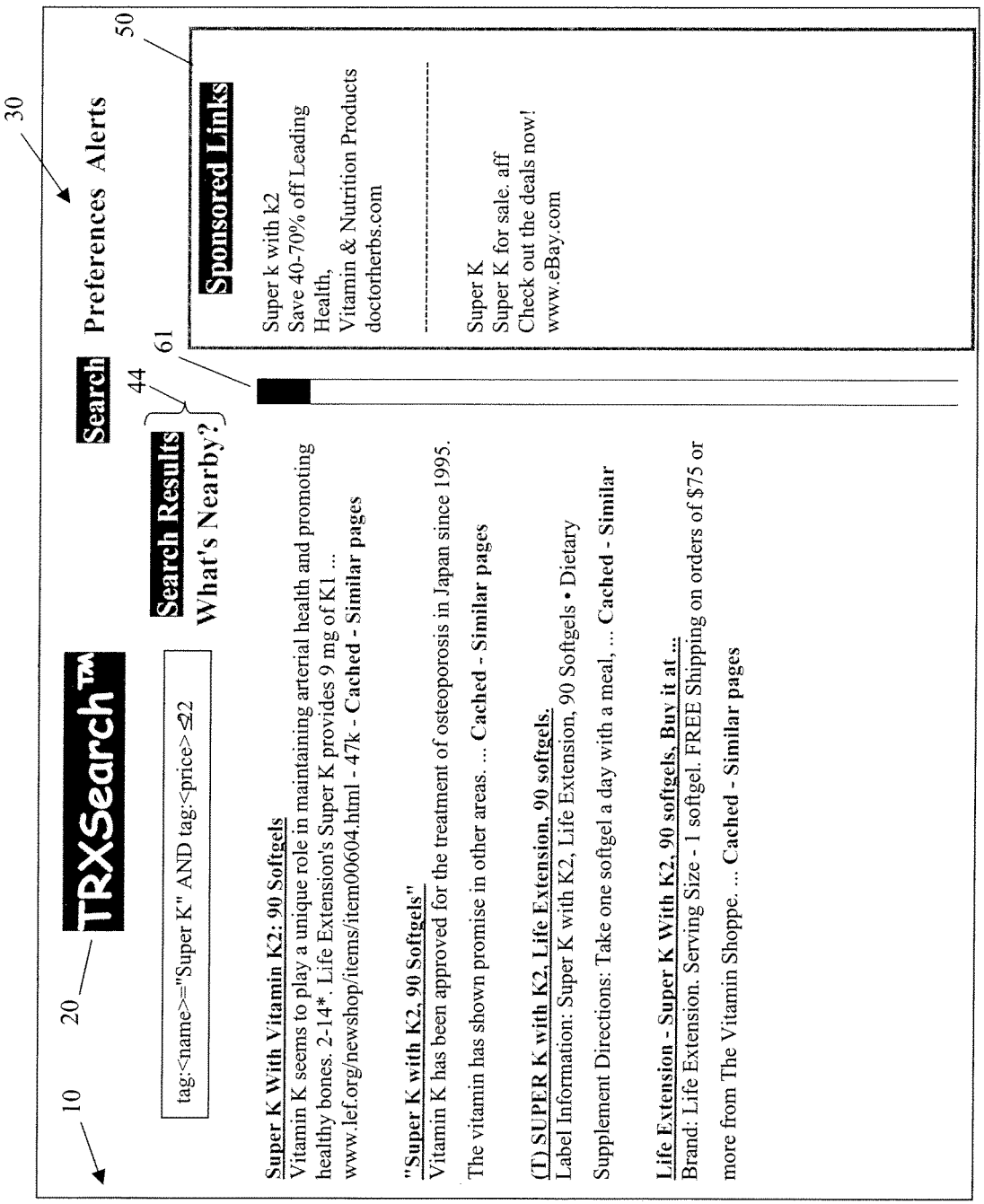
FIG. 6 is a mock-up of a search interface in which a user has entered a search specific for a given metatag name and a range of values for that metatag.

In FIG. 5 the user has chosen to enter search criteria, but in this case rather than merely entering a search term to search the database at large, the user has chosen to search the phrases database. In this particular example, the user entered "phrase:milk", which would trigger the system to provide a listing of phrases containing the term "milk". This includes, for example, "almond milk" and "got milk?". The terms are sorted alphabetically according to the sort choice 151, and here again the user is presented with an "Add" button 155 to conveniently add the selected phrase(s) to the search box. In this particular example, the system could advantageously respond to a user clicking the "Add" button 155 by replacing "phrase:milk" with "No milk today", and re-running the search as in FIG. 1. Although it may not be readily apparent on the reproduction of FIG. 5, the terms "Words" and "Tags" are preferably grayed out in section 152 because they are not viable choices when searching for phrases. Numerous XML alternatives are listed at http://www.pault.coni/pault/pxml/xmlalternatives.html.

In FIG. 6 the user has again chosen to enter specialized search criteria, but here the user has chosen to search for a particular tag name and a particular range of values associated with that tag. In this particular example, the user entered tag:<name>="Super K" AND tag:<price>≤22, which would trigger the system to provide a listing of records in which the tag <name> is associated with a value of "Super K" and the tag <price> is listed with a value less than or equal to 22. Those skilled in the art will immediately appreciate that wild cards and Boolean logic could be used here and in the other examples to create extremely useful searches.

Figure 7:
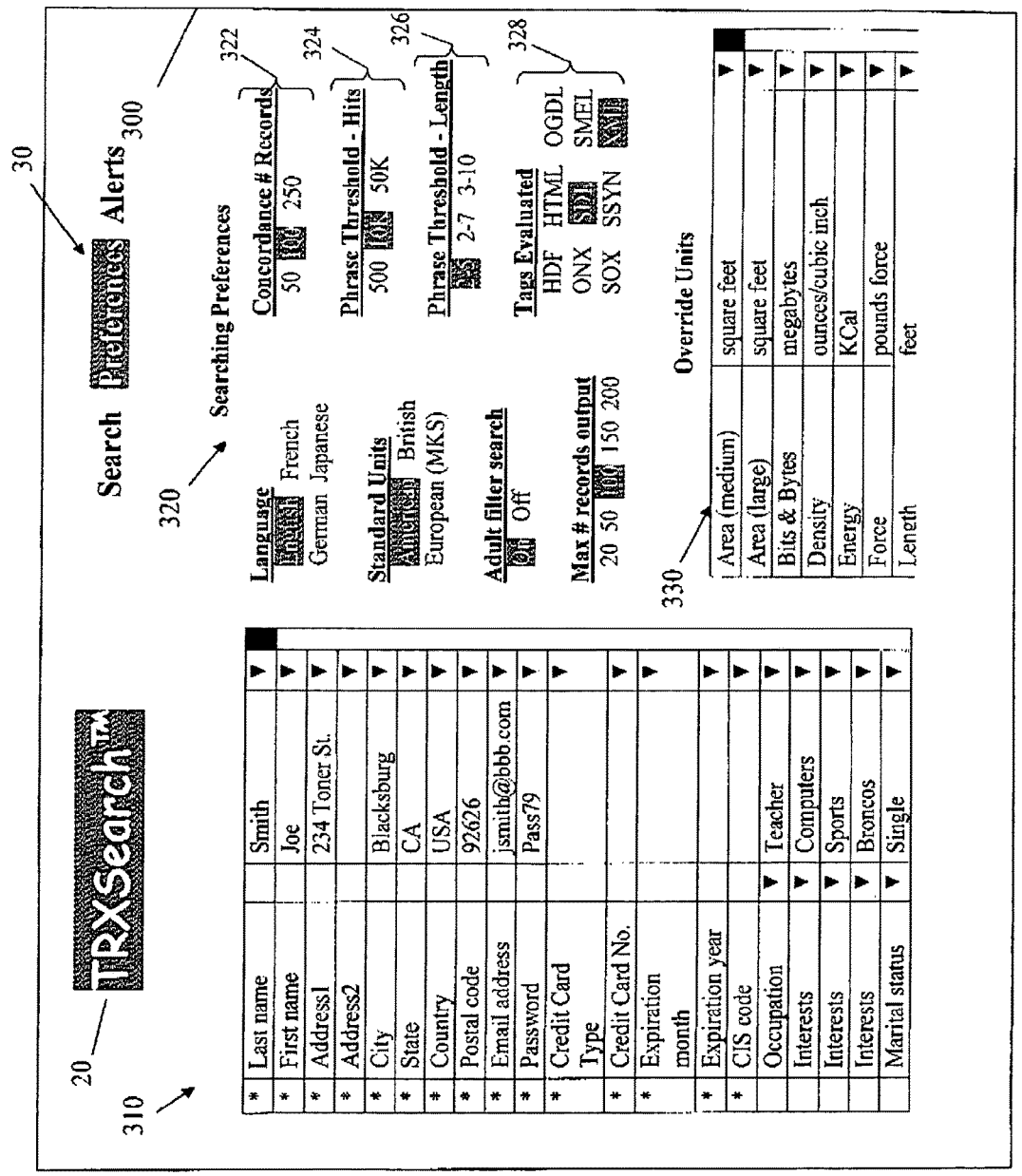
FIG. 7 is a mockup interface for entering and maintaining user information and preferences

FIG. 7 is an interface for entering and maintaining user information and preferences. The interface 300 generally comprises the company identifier 20 and navigation line 30 discussed previously, and also includes a personal information table 310, radio buttons for selecting searching preferences 320, and a table for selecting override units 330. Of particular interest here are sections for selecting preferences discussed above, namely "Concordance # Records" 322, "Phrase Threshold—Hits" 324, "Phrase Threshold—Length" 326, and "Tags Evaluated" 328.

It should be apparent to those skilled in the art that many more modifications besides those already described are possible without departing from the inventive concepts herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps could be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of searching an electronic database, the method comprising:
   receiving from a user interface a first search query that includes first and second search terms;
   identifying a set of multiple documents in the electronic database that each include both the first and second search terms;
   identifying within the set of multiple documents a first proximity window about instances of the first search term, and a second proximity window about instances of the second search term;
   identifying additional terms from within the first and second proximity windows that are semantically unrelated to each of the first and second search terms;
   generating a ranked concordance of at least some of the additional terms along with a relative frequency of each additional term within the first and second proximity windows;
   presenting the ranked concordance of the additional terms found within the first and second proximity windows to the user interface;
   receiving a third search term that the user selected from the ranked concordance; and
   present to the user interface a subset of the set of multiple documents having the third search term within at least one of the first proximity window about instances of the first search term and the second proximity window about instances of the second search term.

2. The method of claim 1 further comprising sorting the ranked concordance.

3. The method of claim 1 further comprising sorting the ranked concordance according to a relative frequency of occurrences of each additional term within the set of multiple documents.

4. The method of claim 1 wherein the first and second search terms each comprises a single word.

5. The method of claim 1 wherein at least one of the additional terms comprises multiple words.

6. The method of claim 1 wherein at least one of the additional terms comprises a data tag.

7. The method of claim 1 wherein at least one of the additional terms comprises a data tag, and another of the additional terms comprises a value corresponding to the data tag.

8. The method of claim 1 wherein t at least one of the additional terms comprises an XML data tag.

9. The method of claim 1 further comprising providing a size selection interface through which the user can select a maximum size of documents to include in the identified documents.

10. The method of claim 1 further comprising including in the ranked concordance contexts of the additional terms, as used within the set of multiple documents.

11. The method of claim 1 further comprising eliminating specified common terms from the listing.

12. The method of claim 1 further comprising receiving from the user a designation of a size of the first proximity window, designating a number of words on either side of the first search term.

13. The method of claim 1 further comprising receiving from the user a designation of a size of the first proximity window, designating a number of characters on either side of the first search term.

14. The method of claim 1 further comprising receiving a limit on a number of records to be included in the set of multiple documents.

15. The method of claim 1, wherein the ranked concordance comprises context for each additional term of the concordance, the context comprising text surrounding each additional term.

* * * * *